Aug. 12, 1930.     H. G. B. MAHON     1,772,908
WATER GAUGE GLASS
Filed Aug. 21, 1928     2 Sheets-Sheet 1
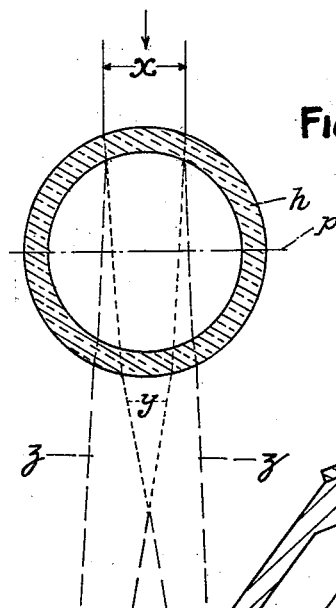
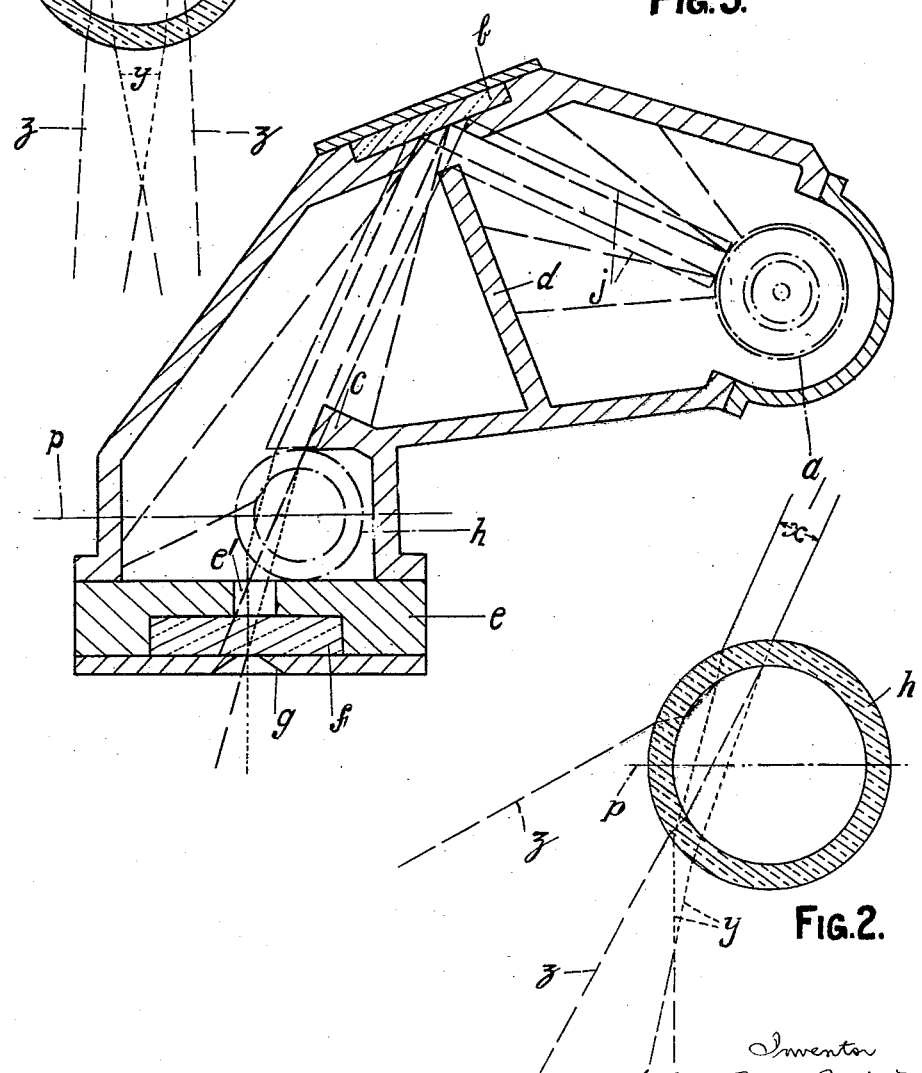

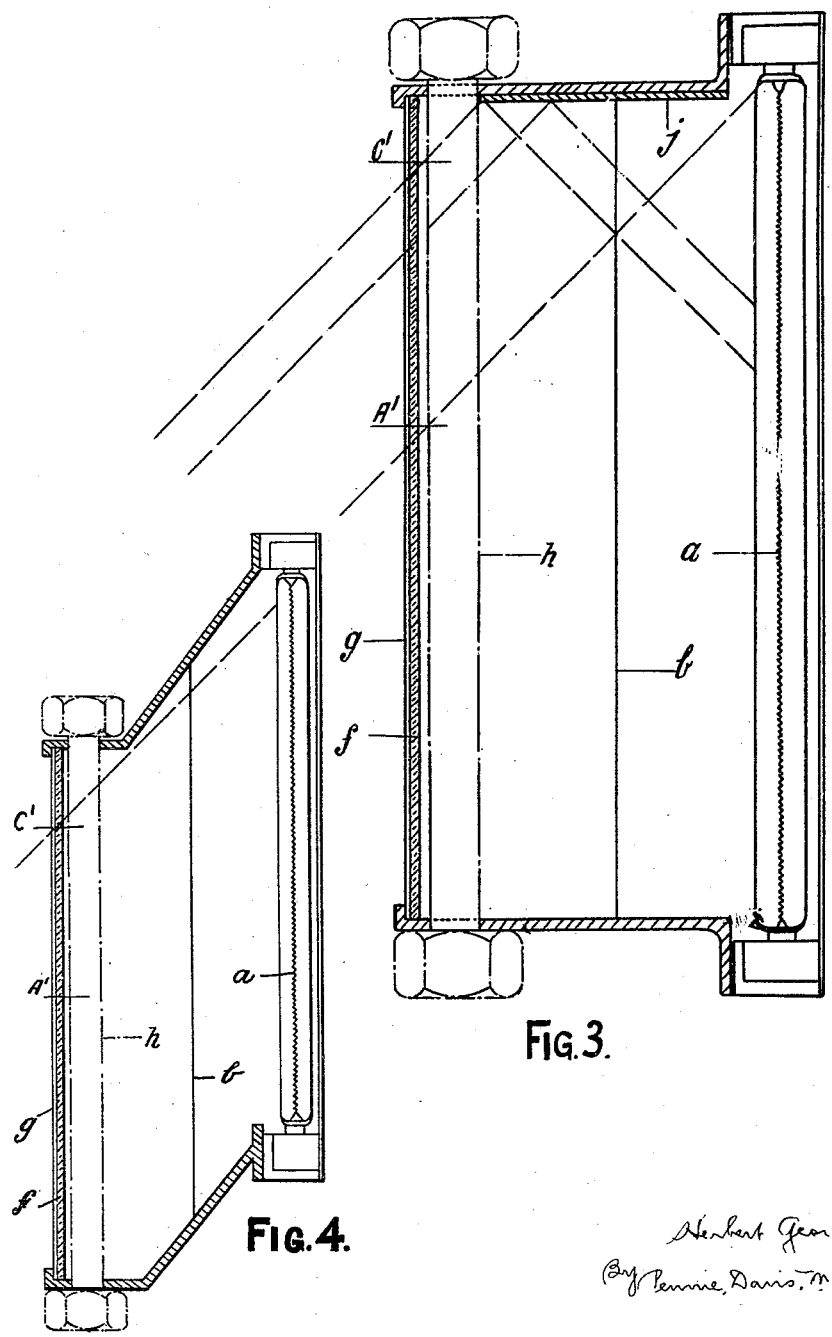

Patented Aug. 12, 1930

1,772,908

UNITED STATES PATENT OFFICE

HERBERT GEORGE BASIL MAHON, OF NEWCASTLE-ON-TYNE, ENGLAND

WATER-GAUGE GLASS

Application filed August 21, 1928, Serial No. 301,138, and in Great Britain October 4, 1927.

This invention relates to improvements connected with water gauge fittings for steam boilers and the like and has for an object to provide a satisfactory means of illuminating such fittings so that the level of the water in the gauge glass of the fitting may be easily and clearly seen when viewed from the boiler house floor below and also so that a full or an empty glass corresponding respectively, to high or low water level of the boiler may be easily distinguishable.

In accordance with the invention I utilize the difference in brilliance between light condensed by that part of the gauge glass which contains water and which functions as a double convex lens, and the dispersed light emitted by that part of the glass containing no water and which functions as a hollow double convex lens or as two meniscus lenses whose concave surfaces face one another.

When there is water in the gauge glass, the cylindrical body of glass and water functions in the same manner as a double convex lens, the refractive indices of the water and glass not differing enough to destroy this feature. The gauge glass will therefore function as a condenser of light rays projected upon it from one side and will project a narrow intense beam of light on the other side.

When there is no water in the gauge glass, the ability of the glass to function as a double convex lens is destroyed and it then functions approximately in the same manner as would a hollow double convex lens, or as two meniscus lenses whose concave surfaces face one another, such a combination acting somewhat similarly to a double concave lens which disperses parallel light rays. Thus, the gauge glass will function as a disperser of light rays projected upon it from one side and will project a wide but weak beam of light on the other side.

The contrast between the condensed and the dispersed light is utilized to distinguish between the filled and empty parts of the gauge glass and hence to indicate clearly the height of the water in the glass, when viewed from the side of the gauge glass from which the rays emerge, either directly or with the interposition of a semi-opaque screen as in this invention.

When the light rays are projected diametrally across the gauge glass sufficient contrast is not obtained between the condensed and the dispersed light rays for practical gauge glass illumination and, in order to render the illumination effective, it is necessary to project the light rays so that they do not pass diametrally across the gauge glass but to one side of a diameter thereof whereby the condensed and dispersed rays separate shortly after leaving the outer surface of the gauge glass.

For the purpose of obtaining uniform illumination to the top of the gauge glass either (1) the illuminating body and the reflecting surface are raised to a height above the top of the gauge glass, such height depending upon the angle at which the gauge glass is viewed from below or, (2) a mirror or reflector is provided and fixed in a horizontal position underneath the top of the fitting.

The invention is illustrated in the accompanying drawings in which Figs. 1 and 2 are horizontal sections of a gauge glass illustrating the principles involved while Fig. 3 is a vertical section illustrating one embodiment of the invention, Fig. 4 a similar section illustrating a modification and Fig. 5 a horizontal section of Fig. 3.

Referring to Figs. 1 and 2 $x$ denotes a beam of light projecting on the gauge glass $h$ and the dotted lines $y$ indicate how the light rays are condensed when they pass through a water filled part of the glass.

The dotted lines $z$ indicate how the light rays are dispersed when passing through the glass $h$ only.

The chain dotted line $p$ in Figs. 1 and 2 represents a vertical plane diametrally intersecting the gauge glass $h$ and parallel with a semi-opaque screen hereinafter described located in front of the gauge glass, on which screen the light rays are projected after passing through the gauge glass.

As shown in Fig. 1 the light rays $x$ are projected diametrally across the gauge glass $h$ at right-angles to the vertical plane $p$. This arrangement, as already explained, does not provide sufficient contrast between the condensed and dispersed rays for practical purposes, so that it is necessary, as shown in Fig. 2, to project a narrow beam of light $x$ on the gauge glass at an angle to the vertical plane $p$ whereby said beam strikes the glass asymmetrically so that the condensed and dispersed light rays separate shortly after leaving the outer surface of the gauge glass.

Owing to the impossibility of obtaining uniform brilliancy of illumination for the full length of the gauge glass when the top end of the illuminant is at the same horizontal level as the top end of the gauge glass, the illuminant may be raised to some height above the top of the gauge glass so that uniform brilliancy of illumination may thus be obtained. In this invention, the effect of raising the illuminant in this manner is obtained by the provision of a mirror fixed in a horizontal or nearly horizontal position to the underside of the top of the fitment, and in the path of light from the illuminant to the gauge glass.

Thus, in Figs. 3 and 4, up to the height $A'$ of the gauge glass, full brilliancy is maintained, the height of the point $A'$ being dependent on the angle of vision. Upwards from the point $A'$ the brilliancy diminishes until at some point near the top of the gauge glass, such as $C'$, there is very little illumination. If now, the illuminating body $a$ and the reflecting surface indicated at $b$ are raised to a higher position as indicated in Fig. 3, respectively, at $a'$ and $b'$ in Fig. 3, then full brilliancy of illumination is obtained up to the point $C'$ on the gauge glass, the loss in brilliancy within the small distance between this point and the top of the gauge glass being of negligible importance.

A like result is, however, obtained by the provision of a horizontal reflecting surface $j$ in the position indicated in Fig. 3.

Referring to Fig. 5 it will be seen that approximately parallel rays from the source of light $a$, which may be a striplight or a number of lights arranged one above the other, are reflected upon the back of the gauge glass $h$ by the mirror $b$ of which only a narrow strip is exposed as shown so as to eliminate diverging rays which would otherwise enter the gauge glass and would illuminate the interior of the fitting behind the gauge glass to an undesirable degree. A light baffle $c$ is provided for limiting the beam of entering light to the required width, while the partition $d$ intercepts direct rays of light from the source of light and thereby assists to darken the interior of the fitting.

In front of the gauge glass $h$ is the screen plate $e$ which protects the semi-opaque ground glass screen $f$ in the event of the gauge glass bursting. The rays of condensed light pass through the slit $c'$ provided in the screen plate $e$ and fall upon the ground glass screen $f$ and are then clearly seen from the front through the narrow aperture $g$ which is set so as to exclude from vision the dispersed rays of light emitted from that part of the gauge glass in which there is no water.

The mirror $b$ may be omitted and the rays of light projected directly from the source of light $a$.

A horizontal or nearly horizontal mirror indicated by the dotted lines $j$ serves to maintain full brilliancy of illumination throughout the length of the gauge glass.

I claim:

1. A gauge glass fitting including a gauge glass, a source of light arranged behind said gauge glass, a screen directing the light from said source on part only of the back of said gauge glass, whereby continuous diverging beams of condensed light and dispersed light are emitted from the front side of said gauge glass, and a receiving screen in front of said gauge glass located so that only one of said beams impinges on said receiving screen.

2. A gauge glass fitting including a gauge glass, a source of light arranged behind said gauge glass, a screen confining light from said source to strike part only of the back of said gauge glass, whereby continuous beams of condensed and dispersed light are emitted from the front side of said gauge glass at an angle to one another, a receiving screen located so that only one of said beams impinges on said receiving screen, and a mask in front of said receiving screen.

3. A gauge glass fitting including a vertical gauge glass, adapted to be viewed from the front, a source of light arranged behind and to one side of said gauge glass, as viewed from the front, a mirror external to said gauge glass, said mirror being adapted to receive and reflect light from said source, means for confining the light reflected by said mirror to strike part only of the back of said gauge glass, whereby continuous beams of condensed light and dispersed light diverging from one another are emitted from the front side of said gauge glass, and a receiving screen in front of said gauge glass located so that only one of said beams is received by said screen.

4. A gauge glass fitting including a vertical cylindrical gauge glass adapted to be viewed from the front, a source of light arranged to one side of said glass, means for directing light emanating from said source to strike only a narrow vertical strip of the back of said gauge glass, said strip extending the entire height of said gauge glass, whereby continuous beams of condensed and dispersed light are emitted from the front side of said gauge glass, said beams containing between them a dihedral angle, and means screening the front of said gauge glass and impinged upon by one only of said beams.

In testimony whereof I have signed my name to this specification.

HERBERT GEORGE BASIL MAHON.